Patented Sept. 10, 1940

2,214,051

UNITED STATES PATENT OFFICE 2,214,051

WETTING AGENT, DETERGENT, AND EMULSIFIER

Peter J. Gaylor, Unionville, N. J., assignor to Standard Oil Development Company, a corporation of Delaware No Drawing. Application November 12, 1938, Serial No. 240,045

15 Claims. (Cl. 260—504)

This invention relates to sulfonates of compounds obtained by condensation of certain petroleum hydrocarbons with olefins of petroleum origin. More specifically, it deals with compounds such as the sulfonates of the condensation products of petroleum hydrocarbon extracts with olefinic hydrocarbons.

According to this invention, it has been found that petroleum hydrocarbons that may be preferentially extracted by the use of solvents, such as phenol, $SO_2$, furfural, nitrobenzene, dichlorethylether, etc., from the mixtures of hydrocarbons, such as those normally gaseous in form at room temperatures and then sulfonated to prepare wetting agents and detergents having improved wetting numbers.

In the past, various detergents have been prepared by the sulfonation of petroleum oils, such as in the sulfonates obtained during the production of white oils. These products have recently found some special uses, but their wide development has been retarded by their poor color and low wetting and detergency properties. Petroleum extracts have also been sulfonated, and although the products have shown improved wetting ability, they nevertheless have proven poor detergents.

An object of the present invention is to produce sulfonated products which have exceptionally good wetting and detergency properties, and in many cases, excellent emulsifying properties as well. Other objects will become apparent from the following description.

In preparing the products employed for this invention, one of the raw materials involved is a petroleum solvent extract, preferably one from a stock which has been freed of asphaltic and resinous substances by treatment with propane, sulfuric acid, clay, or the like. A tarry extract, however, can be purified by such treatment before being employed for the next step in the present process. The extract may be obtained from a lubricating oil fraction, crude oil, bright stock, kerosene, or even gasoline distillates or blends. These may be from naphthenic, aromatic, Pennsylvania, or other base stocks.

The next step in the process is to condense the petroleum extract with an olefinic petroleum hydrocarbon, e. g. cracked gasolines, cracked distillates, cracked wax, cracked gases, or the like. However, it is preferred to employ for the condensation step, an olefinic polymer, such as the polymers obtained by treating gaseous unsaturated refinery gases with phosphoric acid, sulfuric acid, boron halides, aluminum halides, clays, and the like. Polymers boiling between 150° F. and 350° F. are preferred, although higher polymers, such as polymerized cracked wax, are suitable, especially for the production of superior emulsifiers. Other compounds containing alkyl groups, for example, alcohol, may be used in place of the polymers. The polymers are preferred because they show exceptional wetting and detergent properties, probably due to their highly branched structure.

The solvent extract is condensed with the olefin or olefin polymer by the usual Friedel-Crafts catalyst ($AlCl_3$, $BF_3$, etc.) or by the use of sulfuric acid or similar condensation catalysts. Ordinary or slightly elevated temperatures are preferred for this operation.

At the end of the condensation operation, the catalyst is washed out and the product is removed from the unreacted constituents by distillation or otherwise. Purification with clay, charcoal, etc. may be resorted to for removing coloring substances, or the product may be distilled under vacuum.

This condensation product is next treated with sulfuric acid, preferably with strong acid of 85–100% strength, at room temperature, resorting to cooling at intervals to prevent overheating. This treatment with sulfuric acid may be carried out at temperatures below room temperature, if sufficient time is given to effect reaction. During this operation, the acid adds on to the condensation product to produce a sulfonic or alkyl sulfuric acid, or both, since the mechanism of this reaction is uncertain. There also appears to be a rearrangement, indicating that the acid has affected some sort of an isomerization.

After the reaction is complete, the product may be neutralized with any suitable base, e. g. caustic soda, caustic potash, ammonia, onium or sulfonium bases, amines, and the like, and the salt may be recovered by extraction with alcohol and salting out. The products so prepared may be recrystallized if desired, and employed as such or in combination with inorganic salts ($MgSO_4$, NaCl, etc.), fatty soaps, fatty alcohol sulfates, sulfonated aromatic hydrocarbons, and similar materials.

The following examples will illustrate some of the many phases involved in this invention:

Example 1

An $SO_2$ extract of a petroleum oil boiling above 200° C. was condensed with di-, tri- or tetra-isobutylene in the presence of a condensing agent, such as aluminum chloride, zinc chloride, stannic chloride, etc. The oily condensation product thereby obtained was fractionated and a fraction boiling at 160° C. to 200° C. at 7 mm. pressure and representing 22% of the total condensate was treated with sulfuric acid of 80 to 98% concentration at a temperature of 60° C. to 80° C. The resulting product was treated with water to separate free sulfuric acid, neutralized with sodium carbonate and extracted with alcohol. If desired, the salt thereby formed may be salted out and extracted at the same time. The salt that was produced had a wetting number of 43 seconds in soft water, 260 seconds in hard water and 55 seconds in acid.

*Example 2*

A furfural extract of a lubricating oil was mixed with polymers boiling between 10° C. and 120° C. The polymers were produced from a fraction containing 3 to 4 carbon atoms to the molecule and formed by cracking petroleum hydrocarbons at high temperatures by contacting with phosphoric acid on clay at temperatures of about 120° C. and at a pressure of 200 lbs./sq. in. The mixture of the extract and the polymers were condensed using 1% of boron fluoride as the condensation agent. The condensate was then sulfonated by contacting with sulfuric acid of 80 to 98% concentration at a temperature of 60° C. to 80° C.

*Example 3*

A phenol extract of a lubricating oil having an A. P. I. gravity of 13.9 and an aniline point of 55 C. with an initial boiling point of 204° C. with 50% off at 373° C. was mixed with a petroleum fraction obtained on cracking petroleum oils and having 4 carbon atoms to the molecule and consisting of 11.5% of isobutane, 14.7% of isobutylene, 11.7% of a-butylene, 23.6% of b-butylene and 38.5% of normal butane. The mixture was treated with 90% of sulfuric acid and maintained at room temperature. After the sulfonation was completed, the mixture was diluted and free sulfuric acid separated, neutralized and extracted with alcohol.

*Example 4*

A petroleum fraction boiling between 150° C. and 340° C. was extracted with liquid $SO_2$ and mixed with polymers of propylene. The polymers of propylene were prepared by contacting the propylene with clay at an elevated temperature or by thermal polymerization alone. Copolymers of propylene may also be used. The mixture of the $SO_2$ extract and the polymers of propylene are contacted with aluminum chloride. An oily viscous liquid is separated which is distilled to obtain a fraction boiling between 150° C. and 250° C. The oily fraction is then contacted with sulfuric acid of 80 to 98% concentration and maintained at a temperature of 60° C. to 80° C. until sulfation is complete. The mixture is then treated with water to separate the free acid, neutralized and extracted with alcohol.

This invention is not to be limited to the specific embodiments shown or the specific examples given, nor to any theories advanced as to the operation of the invention, but in the appended claims it is intended to claim all inherent novelty in the invention as broadly as the prior art permits.

I claim:
1. A composition of matter consisting of a salt of a sulfonated condensation product of a petroleum solvent extract obtained by treating petroleum hydrocarbons with a preferential solvent having a selectivity for hydrocarbons of the nature of that exhibited by liquid sulfur dioxide and an olefinic hydrocarbon.

2. A composition of matter consisting of a salt of a sulfonated condensation product of a petroleum solvent extract obtained by treating petroleum hydrocarbons with a preferential solvent having a selectivity for hydrocarbons of the nature of that exhibited by liquid sulfur dioxide and a polymer of an olefinic hydrocarbon.

3. A composition of matter consisting of a salt of a sulfonated condensation product of a petroleum solvent extract obtained by treating petroleum hydrocarbons with a preferential solvent having a selectivity for hydrocarbons of the nature of that exhibited by liquid sulfur dioxide and a polymer of an olefinic hydrocarbon substantially free of asphaltic and resinous materials.

4. A composition of matter consisting of a salt of a sulfonated condensation product of petroleum soluble in liquid sulfur dioxide, and a polymer of olefinic hydrocarbons.

5. A composition of matter consisting of a salt of a sulfonated condensation product of a petroleum extract soluble in phenol, and a polymer of an olefinic hydrocarbon.

6. A composition of matter consisting of a salt of a sulfonated condensation product of a petroleum solvent extract obtained by treating petroleum hydrocarbons with a preferential solvent having a selectivity for hydrocarbons of the nature of that exhibited by liquid sulfur dioxide and a polymer of an olefinic hydrocarbon boiling between 150° and 350° F.

7. A composition of matter consisting of a salt of a sulfonated condensation product of a petroleum solvent extract obtained by treating petroleum hydrocarbons with a preferential solvent having a selectivity for hydrocarbons of the nature of that exhibited by liquid sulfur dioxide and a polymer of isobutylene.

8. A process of producing a wetting and detergent material, which comprises extracting a petroleum hydrocarbon with a preferential solvent material having a selectivity for hydrocarbons of the nature of that exhibited by liquid sulfur dioxide, condensing the extract with a polymer of an olefinic hydrocarbon and sulfonating the condensate.

9. A process of producing a wetting and detergent material according to claim 8 in which the sulfonated product is neutralized with an alkali.

10. A process of producing a wetting and detergent material, which comprises extracting a petroleum hydrocarbon with liquid sulfur dioxide, condensing the extract with a polymer of an olefinic hydrocarbon, sulfonating the product obtained thereby and neutralizing with caustic soda.

11. A process of producing a wetting and detergent material, which comprises extracting a petroleum hydrocarbon with phenol, condensing the extract with a polymer of an olefinic hydrocarbon, sulfonating the product obtained thereby and neutralizing with caustic soda.

12. A process of producing a wetting and detergent material, which comprises extracting a petroleum hydrocarbon with furfural, condensing the extract with a polymer of an olefinic hydrocarbon, sulfonating the product obtained thereby and neutralizing with caustic soda.

13. A process of producing a wetting and detergent material, which comprises extracting a petroleum hydrocarbon with a preferential solvent having a selectivity for hydrocarbons of the nature of that exhibited by liquid sulfur dioxide, condensing the extract with a polymer of isobutylene, treating the resulting product with concentrated sulfuric acid and neutralizing.

14. Process according to claim 13 in which the polymer of olefinic hydrocarbons is isobutylene.

15. Process according to claim 13 in which a petroleum hydrocarbon is a fraction boiling above 200° C.

PETER J. GAYLOR.